United States Patent [19]

Liljestrom

[11] 4,413,943
[45] Nov. 8, 1983

[54] METHOD AND APPARATUS FOR LOADING AND UNLOADING A LENGTHY OBJECT FROM A TRANSPORT VEHICLE

[76] Inventor: Leo L. Liljestrom, Renvallinkuja 4, 00840 Helsinki 84, Finland

[21] Appl. No.: 281,912

[22] Filed: Jul. 9, 1981

Related U.S. Application Data

[63] Continuation-in-part of Ser. No. 91,532, Nov. 5, 1979, abandoned.

[30] Foreign Application Priority Data

Nov. 8, 1978 [FI] Finland .................................. 783399

[51] Int. Cl.³ .............................................. B60P 1/28
[52] U.S. Cl. .................................. 414/475; 280/80 B; 280/434; 414/484; 414/494; 414/786
[58] Field of Search ............... 414/475, 494, 483, 484; 280/80 B, 433, 434

[56] References Cited

U.S. PATENT DOCUMENTS 2,850,292  9/1958  Holland ................................ 280/434
3,303,950  2/1967  Jones .................................... 414/475
3,987,919  10/1976  Weeks et al. ...................... 414/475 X

*Primary Examiner*—Robert G. Sheridan
*Attorney, Agent, or Firm*—Burns, Doane, Swecker & Mathis

[57] ABSTRACT

To unload a lengthy object from a transport trailer, the rear of the trailer is supported by legs and the bogie wheels at the rear are shifted fowardly. As they reach the front of the trailer, they are automatically coupled to the tractor and the tractor is disconnected from the trailer. The bogie wheels continue their forward motion and push the tractor from beneath the trailer. The rear of the trailer is then lowered to the ground and the lengthy object is released from the trailer and slides into engagement with the ground. Thereafter, the trailer is driven forward by the tractor, while coupled to the bogie wheels, until the object is unloaded. The rear of the trailer is then raised by the legs and the bogie wheels are shifted rearwardly to their initial position, whereby the tractor is pulled into coupling engagement with the trailer and the bogie wheels are released from the tractor.

5 Claims, 5 Drawing Figures

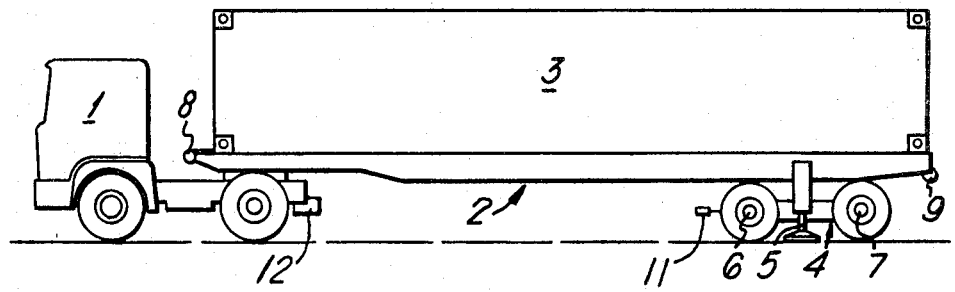
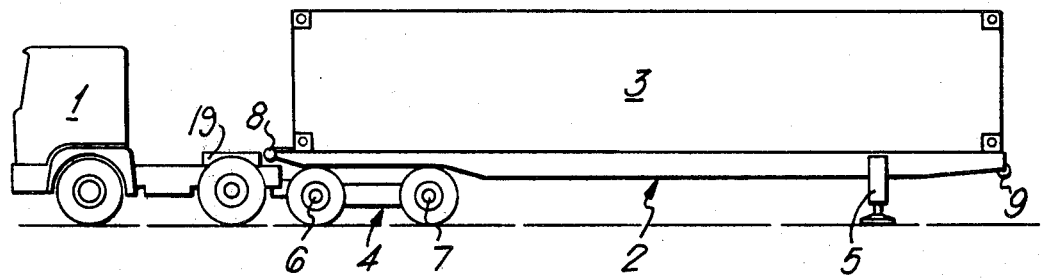
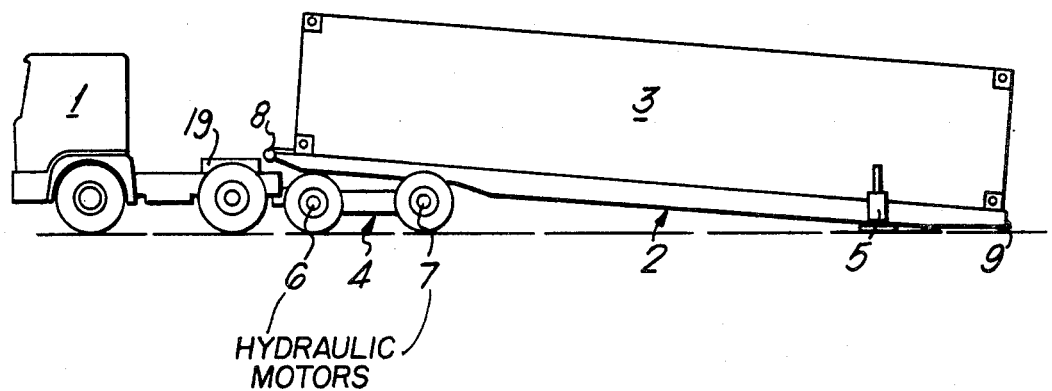

METHOD AND APPARATUS FOR LOADING AND UNLOADING A LENGTHY OBJECT FROM A TRANSPORT VEHICLE

REFERENCE TO RELATED APPLICATION

This is a continuation-in-part of application Ser. No. 91,532 filed on Nov. 5, 1979, now abandoned, the disclosure of which is hereby incorporated by reference.

BACKGROUND OF THE INVENTION

The present invention relates to a method for loading a lengthy object, such as a transport container, onto a vehicle and for unloading of the object from the vehicle by using a winch, or equivalent means, mounted on the vehicle, by means of which winch the object is pulled onto the chassis construction, or equivalent, of the vehicle.

The invention also relates to a vehicle designed for implementation of the method mentioned above, which vehicle is provided with a winch for pulling the object onto the vehicle.

A method is previously known by means of which a vehicle can be loaded by using a so-called transfer truckbed system. Such a system comprises several loose truckbeds, which can be pulled onto the truck by means of a winch. It is necessary to raise the dumping mechanism to some extent in order that the truckbed should not be jerked very strongly when the center of gravity of the truckbed is shifted onto the vehicle frame. This method has been applied to the loading of so-called semi-long containers (e.g., 20 ft), and is marketed under the trade name "Multilift". A drawback to this system is the steep loading angle, due to which the goods inside the container can become disarrayed. In order to avoid this, it is a known procedure to use cranes mounted on the vehicle. These, however, increase the overall length of the truckbed to an unreasonable extent.

A particularly serious problem consists of the loading and unloading of so-called long containers. By long containers are meant 12 meter long (40 ft) containers, by means of which a major part of freight traffic is transported today. Loading of these long containers onto a vehicle by using, e.g., the method known under the trade name "Multilift", is impossible. This is due to the circumstance that the construction of long containers does not stand such handling.

For long containers, it is a known procedure to provide the vehicle with cranes mounted on the truckbed. This, however, results in the drawback that the overall length of the vehicle exceeds the overall length permitted by many statutes. Another drawback is that, since the cranes mounted on the truckbed increase the totoal weight of the vehicle considerably, the maximum total weight permitted by statute is easily exceeded. There are vehicles of this type, e.g., in Finland, but they are only allowed to operate under exceptional permit within the area of the City of Helsinki.

Another method for loading and unloading long containers, in fact the only practical one available at present, is the use of large fork-lift trucks and straddle carriers. These are, however, available only in a few places. This results in the circumstance that a large container is usually not unloaded from the vehicle at the customer's premises, but the vehicle remains waiting until the load in the container has been unloaded. Of course, it is uneconomical to make expensive transport equipment stand unnecessarily during the unloading of the container. As a matter of fact, the whole idea of container transports then loses much of its meaningfulness.

Some of the drawbacks of the vehicles meant for the transport of long containers are mentioned above. Owing to cranes mounted on the truckbed, the overall length and frequently also the total weight of the vehicles exceed those permitted by statute. Under these circumstances, they cannot be used without particular permit. Consequently, many vehicles include systems of handling containers that are highly complicated and expensive.

On the other hand, if the vehicles have no handling equipment of this type and only external loading and unloading aid is utilized, the standing times of the vehicles become unreasonably long.

SUMMARY OF THE INVENTION

In order to avoid the drawbacks described above, the method for loading lengthy objects in accordance with the present invention is characterized by bogie support wheels that are shifted to the front of a transport trailer to push a tractor from beneath the trailer and enable the rear end of the trailer to be lowered to the ground.

By means of the method in accordance with the invention, several advantages are obtained as compared with known methods. First, the entire container unit can be delivered to the customer's premises without help. This is advantageous for the customer, who does not have to pay harbour dues, or similar such charges, for a long period of time. The method in accordance with the invention is also advantageous from the point of view of the carrier, because the standing times of the vehicles remain considerably shorter than at present.

A vehicle constructed in accordance with the invention also possesses several advantages. By means of this vehicle, the loading and unloading of long objects, e.g., 12 meter containers, can be performed without outside help practically anywhere. The dimensions of the vehicle can be brought within the limits required by statute at the same time as the payload of the vehicle increases as compared with, e.g., vehicles of the known type provided with cranes.

The manner in which the invention achieves these advantages and other will become more apparent from the following detailed description of a preferred embodiment thereof, when taken in conjunction with the accompanying drawings.

BRIEF DESCRIPTION OF THE DRAWINGS

FIG. 1 illustrates the method in accordance with the invention and the vehicle in step I of the unloading of a transport container;

FIG. 2 illustrates the method in accordance with the invention and the vehicle in step II of the unloading;

FIG. 3 illustrates the method in accordance with the invention and the vehicle in step III of the unloading;

DETAILED DESCRIPTION

Figure 4:
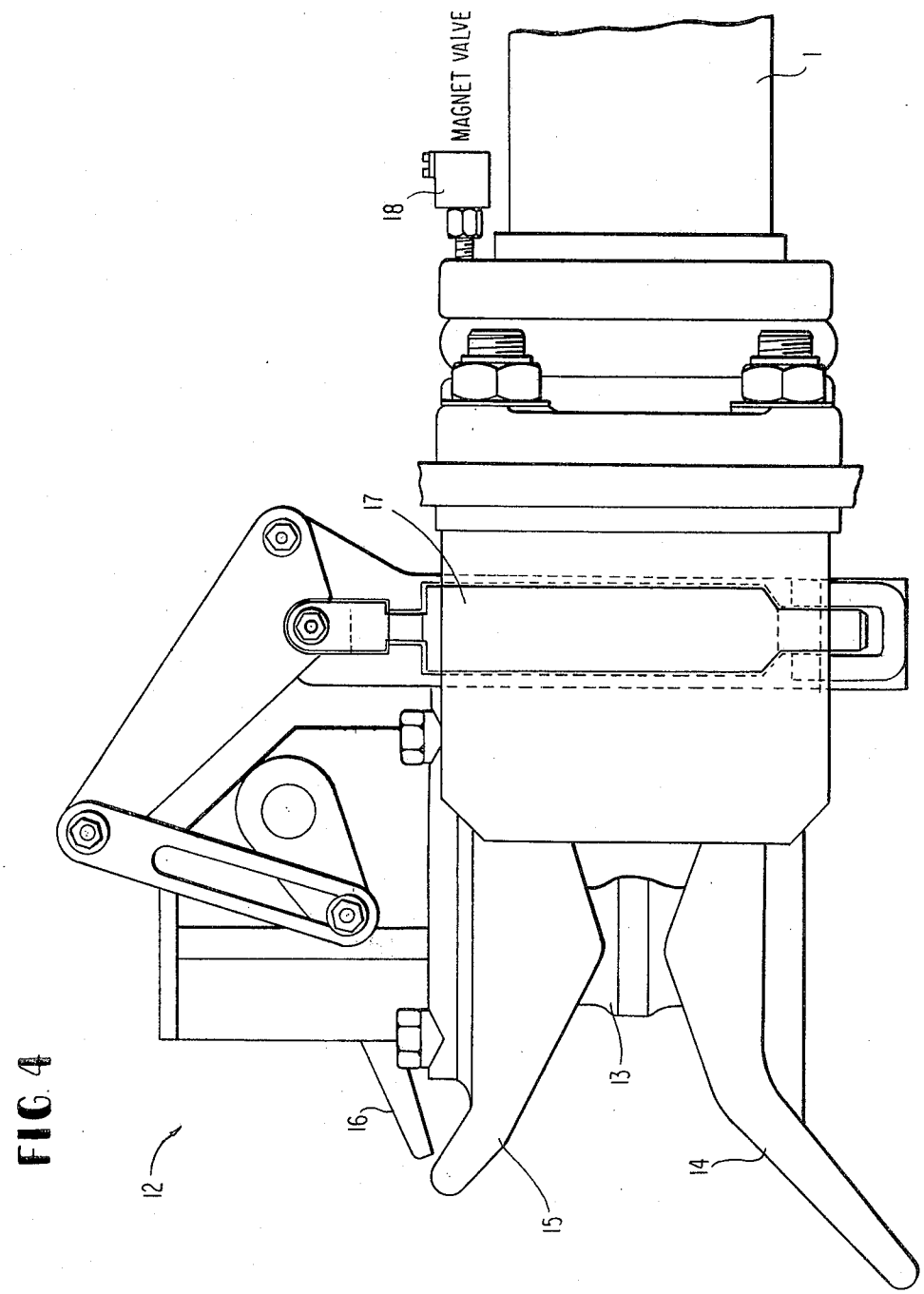
FIG. 4 is a side view of a traction hook device.

Referring to FIG. 1, a vehicle in accordance with the novel concepts of the present invention comprises a tractor vehicle 1 and a semi-trailer 2 coupled to the tractor. The trailer 2 is loaded with a so-called long container 3. Support legs 5 are mounted between the wheels of the rear bogie 4 of the trailer. These legs can be hydraulically raised and lowered so that the rear end of the trailer can be supported against the ground by means of the legs.

The bogie 4 of the trailer is so constructed that it can be shifted in the longitudinal direction of the trailer. For this purpose, appropriate guides or equivalent means are formed onto the frame of the trailer. Hydraulic motors 6, 7 are mounted in one or both of the axles and provide the shifting force for the rear bogie. To facilitate movement of the bogie 4, the support legs 5 can be hydraulically shifted in a horizontal direction away from the chassis of the trailer 2, so that the rear bogie 4 can be unobstructedly moved in the longitudinal direction of the trailer while the support legs 5 are positioned on the ground. In the front part of the trailer, a winch device 8 is mounted, whose purpose is to move the container 3 onto the trailer when the trailer is being loaded and, correspondingly, off the trailer when the trailer is being unloaded. The rear bogie 4 includes a traction eye, or eyehook, 11 that is resiliently mounted on the front axle of the bogie, for example. At the rear end of the tractor 1 is located a traction hook 12 at the same level as the traction eye of the rear bogie.

The traction hook 12 can be any suitable conventional type of traction hook, such as the VBG 621 (AUTOMATIC) manufactured by VBG Produkter KB of Ruotsi, Finland. Such a device is illustrated in detail in FIG. 4. The hook includes a vertically displaceable pin 13 disposed in a notch formed between two diverging plates 14, 15. The pin 13 can be manually raised out of the notch by a pivotable handle 16. Alternatively, the pin can be actuated from a remote position, for example in response to a control signal, by a hydraulic cylinder and piston arrangement 17. The pin 13 can be latched in its raised position and biased to automatically return to its lowered position when engaged by an eye hook, to thereby couple the eye hook to the tractor 1, in a well-known manner.

The traction hook 12 can also include a magnet valve 18, or similar such device, for automatically providing a hydraulic, electrical, or magnetic control signal when the pin 13 moves into its locking, i.e., lower, position to couple the bogie eye hook 11 to the tractor 1. This control signal is fed to the fifth wheel mechanism 19 of the tractor to automatically uncouple the tractor 1 from the trailer 2. One conventional type of fifth wheel mechanism that is suitable for use in the contex of the present invention is the York "Big D" Dockspotter mechanism, manufactured and sold by York Truck Equipment, Ltd. of Corby, England.

Figure 5:
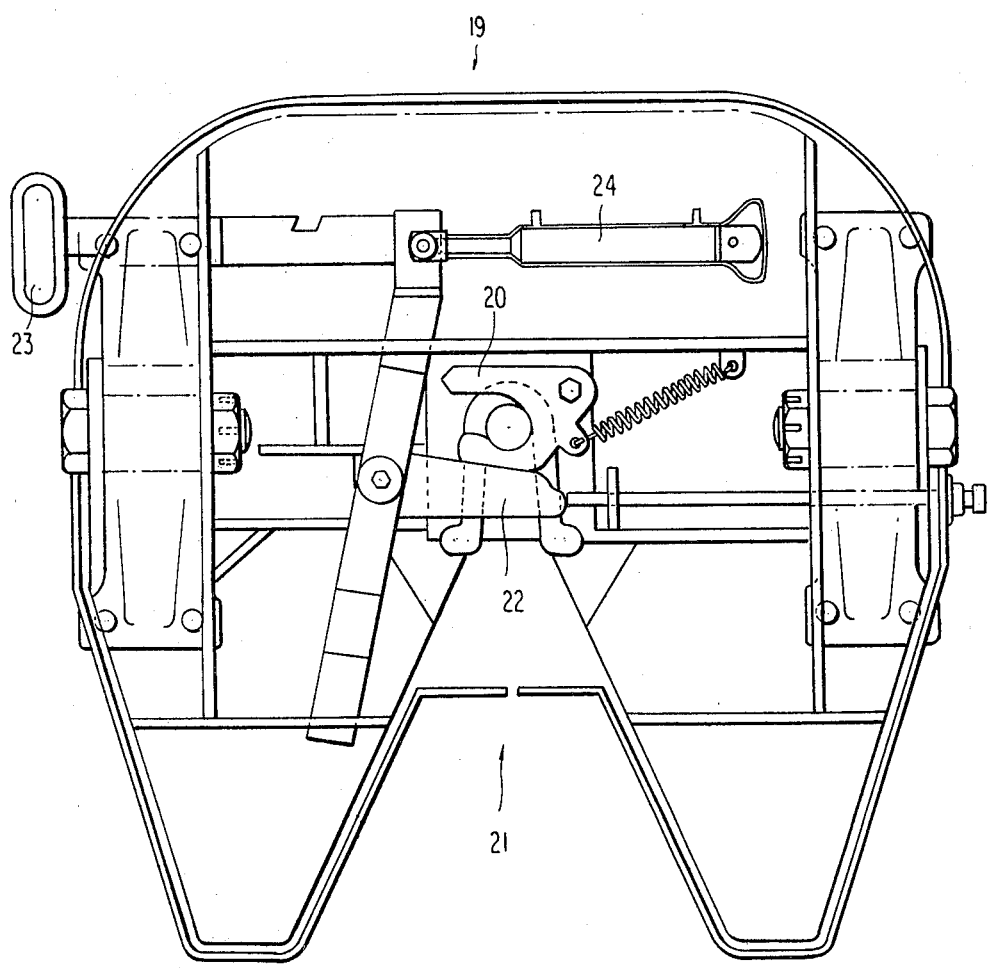
FIG. 5 is a top view of a fifth wheel device.

A device of this type is illustrated in detail in FIG. 5. It includes a hook member 20 that is normally biased to an open position. When the tractor is backed into engagement with the trailer, a pin on the trailer is received in a notch 21 in the fifth wheel and forces the hook member 20 to the closed position illustrated in FIG. 5. The hook member is maintained in the closed position by a latch member 22, to thereby couple the trailer to the tractor. To uncouple the tractor and trailer, the latch member 22 can be manually pivoted away from the latching position by a handle 23. Alternatively, the tractor and trailer can be automatically uncoupled, for example in response to a hydraulic control signal from the magnet valve 18, by means of a piston and cylinder arrangement 24.

The rear corners of the trailer may be provided with small wheels or rollers 9 (for example 4 rollers), which permit shifting of the corner of the trailer in relation to the ground in certains steps of loading and unloading.

The method in accordance with the invention comprises the following steps. FIGS. 1-3 illustrate the unloading of a long container from a semitrailer, step by step. When a container is to be unloaded from a vehicle, the support legs 5 are hydraulically lowered to the ground. In the drawing they are shown placed between the wheels, because there is space from them in that position. In principle, the support legs may be placed practically at any position whatsoever at the rear end of the trailer. When the support legs are firmly on the ground, the rear bogie 4 is unlocked from its position at the rear of the frame of the trailer. In the following step, which is illustrated in FIG. 2, the rear bogie 4 is shifted by means of the hydraulic motors in the axles, to beneath the front part of the trailer.

As the rear bogie 4 is shifted towards the front end of the trailer, the traction eye 11 slides into the notch of the traction hook on the tractor 1 and triggers the locking of the traction hook. Thus, the rear bogie 4 is automatically attached to the tractor. As the traction hook is closed, it gives an impulse, through the magnet valve 18, to the hydraulic cylinder 24 of the fifth wheel 19 which hydraulic cylinder uncouples the traction car 1 from the trailer. The rear bogie 4 continues to move forward and simultaneously pushes the tractor 1 away from underneath the front of the trailer 2. However, the rear bogie 4 is attached to the traction hook 12 of the traction car 1.

The bogie 4 moves forward to the end of the guides on the trailer chassis, and can be automatically coupled underneath the front end of the trailer by means of its locking device.

The rear bogie 4 is constructed so that it can, when desired, turn 360° relative to the trailer. Moreover, the structure of the rear bogie 4 is such that the trailer 2 remains in a horizontal position, although the ground clearance of the trailer chassis is greater at the normal coupling point of the tractor, near which point the rear bogie is locked, than at the rear end of the trailer (FIGS. 1 and 2).

In the next step, which is illustrated in FIG. 3, the rear end of the trailer is hydraulically lowered to the ground by means of the support legs 5. The support legs 5 are partly lifted from the ground so that the rear end of the trailer rests on wheels, or rollers, 9.

The container is shifted by means of the winch device 8 so that the rear end of the container hits the ground. Thereafter the tractor 1 and the trailer 2 are driven away from underneath the container. Consequently, the container remains in its place both during the loading and unloading operations. It is to be noted that the total height of the trailer 2 hardly changes at all during this process. The loading and unloading of containers is thereby facilitated even in fairly low storing facilities.

Thereafter, the rear of the trailer is raised to the normal height by means of the hydraulic legs 5. Thereupon the rear bogie 4 can be shifted back into its original position. At the intial stage of the shifting the rear bogie is locked to the tractor and pulls its along with it until the coupling means of the tractor and the trailer are one above the other, whereupon the tractor and trailer are automatically coupled in a well-known manner. Simultaneously, the cylinder 17 of the traction hook 12 is actuated to release the bogie 4 from the tractor. The actuation of the cylinder can be carried out automatically, for example in response to a signal indicating the coupling of the tractor and the trailer. The hydraulic motors 6, 7 can continue to move the rear bogie 4 back to its initial position, where it is locked to the frame of the trailer. Finally, the support legs 5 are raised and the vehicle is ready for transport.

Loading takes place almost in the same way. The vehicle is driven to the front of the container to be loaded, and aligned with the container. The support legs 5 are lowered and the rear bogie 4 is shifted, in the manner described previously by means of the hydraulic motors 6, 7, to underneath the front part of the trailer. After this the rear of the trailer is lowered. The tractive means of the winch 8 are attached to the container 3, by means of which the container is pulled onto the trailer. Hereupon the rear of the trailer is raised by means of the support legs 5, and the rear bogie 4 is shifted to its rear position and is locked. In this way the vehicle is ready for operation.

The tractor 1 can function as the power source for the various trailer devices during the loading and unloading phases.

The loading/unloading angle of the trailer is small because, on one hand, the trailer 2 is long (12 m), and on the other hand, the rear bogie 4 is moved to the very front end of the trailer. Thus, the contents of the container do no get into disorder, nor are unreasonable requirements imposed on the construction of the container.

Because the rear bogie can be turned in its loading-/unloading position (FIG. 3) and the trailer is provided with rollers 9, the shifting of the trailer and the container, for example in the narrower spaces of dock areas, is easily carried out with a tractor. This has not been possible when employing prior art constructions.

The present invention may be embodied in other specific forms without departing from the spirit or essential characteristics thereof. For example, it is not limited to tractor-trailer combinations, and the method in accordance with the invention may, with certain limitations, be applied even to a conventional lorry. In such a case, a different arrangement is required for the traction gear of the lorry, because the use of a conventional cardan shaft, for example, is not possible. For example, by means of a front-wheel drive it is possible to solve this problem, and there are also other possibilities of implementation.

The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A method of loading a lengthy object onto a transporting vehicle comprising a tractor and a trailer having adjustable support legs at its rear end, a bogie wheel assembly movable in the longitudinal direction of the trailer, and a winch for pulling the object onto the trailer, comprising the steps of:
   supporting the rear end of the trailer by means of its support legs;
   shifting the bogie wheel assembly to the front of the trailer;
   decoupling the tractor from the trailer as the bogie wheel assembly nears the front of the trailer;
   coupling the bogie wheel assembly to the tractor;
   moving the tractor forward from beneath the trailer;
   lowering the rear end of the trailer to the ground; and
   pulling the object onto the trailer by means of the winch.

2. The method of claim 1 wherein the bogie wheel assembly pushes the tractor forward during its shifting movement.

3. Apparatus for facilitating the loading and unloading of the trailer of a tractor-trailer combination, comprising:
   means to couple and decouple the tractor and trailer;
   adjustable support legs disposed at the rear end of the trailer;
   a bogie wheel assembly normally attached to the rear end of the trailer and movable to the front end of the trailer a distance sufficient to push the tractor from beneath the trailer so that the front end of the trailer is supported by the bogie wheel assembly alone;
   means for moving the bogie wheel assembly along the trailer; and
   means for coupling the bogie wheel assembly to the tractor when the bogie wheel assembly is moved to its forward position.

4. The apparatus of claim 3 further including means for automatically disconnecting the tractor from the trailer when the bogie wheel assembly reaches a predetermined location during movement to its forward position and automatically coupling said bogie wheel assembly to the tractor.

5. The apparatus of claim 3 further including a wheel disposed at the rear end of the trailer for enabling the trailer to be moved while its rear end is in contact with the ground.

* * * * *